US012627950B2

(12) United States Patent
Dai et al.

(10) Patent No.: US 12,627,950 B2
(45) Date of Patent: May 12, 2026

(54) METHOD AND APPARATUS FOR MULTICAST AND BROADCAST SERVICES

(71) Applicant: Lenovo (Beijing) Limited, Beijing (CN)

(72) Inventors: Mingzeng Dai, Shanghai (CN); Lianhai Wu, Chaoyang (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 589 days.

(21) Appl. No.: 18/043,140

(22) PCT Filed: Aug. 28, 2020

(86) PCT No.: PCT/CN2020/112148
§ 371 (c)(1),
(2) Date: Feb. 27, 2023

(87) PCT Pub. No.: WO2022/041127
PCT Pub. Date: Mar. 3, 2022

(65) Prior Publication Data
US 2024/0236619 A1     Jul. 11, 2024

(51) Int. Cl.
*H04W 4/06*          (2009.01)
*H04W 76/40*         (2018.01)
(52) U.S. Cl.
CPC ............. *H04W 4/06* (2013.01); *H04W 76/40* (2018.02)
(58) Field of Classification Search
CPC ........ H04W 4/06; H04W 76/40; H04W 76/22
See application file for complete search history.

(56) References Cited

U.S. PATENT DOCUMENTS 8,310,957 B1 * 11/2012 Rekhter ................. H04L 45/16
                                                       370/256
10,834,772 B2 * 11/2020 Wang .................... H04W 76/11
(Continued)

FOREIGN PATENT DOCUMENTS

CN          108141784 A      6/2018
CN          109644089 A      4/2019
(Continued)

OTHER PUBLICATIONS

Huawei , "DAPS HO in split gNB", 3GPP TSG-RAN WG3 #106, R3-196897, Reno, NV, USA [retrieved Mar. 9, 2023]. Retrieved from the Internet <https://www.3gpp.org/ftp/tsg_ran/WG3_lu/TSGR3_106/Docs>., Nov. 2019, 4 Pages.
(Continued)

*Primary Examiner* — Michael A Keller
(74) *Attorney, Agent, or Firm* — FIG. 1 Patents

(57)          ABSTRACT

Embodiments of the present application relate to a method and apparatus for multicast and broadcast services (MBS). An exemplary method includes: transmitting a set of user data packet over a shared tunnel for multicast data radio bearer (M-DRB) and unicast data radio bearer (U-DRB), wherein each of the set of user data packet is associated with at least one of: a M-DRB; and one or more U-DRBs; and receiving a data delivery status frame for each of the at least one of the M-DRB and one or more U-DRBs. Embodiments of the present application can support the user plane protocol in the case of multiple transmission modes in the MBS.

20 Claims, 9 Drawing Sheets

100

(56) References Cited

U.S. PATENT DOCUMENTS

| | | | | |
|---|---|---|---|---|
| 11,044,612 | B2 * | 6/2021 | Aminaka | H04W 16/14 |
| 11,323,911 | B2 * | 5/2022 | Dai | H04W 76/18 |
| 2020/0084636 | A1 | 3/2020 | Zhang et al. | |
| 2020/0120535 | A1 * | 4/2020 | Dai | H04W 76/27 |
| 2021/0385825 | A1 * | 12/2021 | Meylan | H04W 72/21 |
| 2022/0038960 | A1 * | 2/2022 | Xu | H04W 36/0011 |
| 2023/0081286 | A1 * | 3/2023 | Liang | H04W 36/0007 370/331 |
| 2023/0099695 | A1 * | 3/2023 | Kang | H04W 4/06 370/312 |
| 2023/0180350 | A1 * | 6/2023 | Zhu | H04W 76/40 370/312 |
| 2023/0199439 | A1 * | 6/2023 | Ma | H04W 28/0268 455/414.1 |
| 2023/0225008 | A1 * | 7/2023 | Malkamäki | H04W 76/20 370/312 |
| 2023/0247389 | A1 * | 8/2023 | Chen | H04W 4/06 370/329 |
| 2023/0354106 | A1 * | 11/2023 | Godin | H04W 72/30 |
| 2023/0397233 | A1 * | 12/2023 | Wu | H04W 76/40 |
| 2024/0098831 | A1 * | 3/2024 | Zhang | H04W 4/06 |
| 2024/0214875 | A1 * | 6/2024 | Mohammed Mikaeil | H04W 36/0007 |
| 2024/0407022 | A1 * | 12/2024 | Wu | H04W 4/06 |
| 2024/0422802 | A1 * | 12/2024 | Wu | H04W 76/12 |
| 2024/0422803 | A1 * | 12/2024 | Wu | H04W 76/40 |
| 2024/0422804 | A1 * | 12/2024 | Wu | H04W 72/30 |
| 2024/0430981 | A1 * | 12/2024 | Wu | H04W 72/00 |
| 2025/0008593 | A1 * | 1/2025 | Wu | H04W 76/40 |
| 2025/0016885 | A1 * | 1/2025 | Wu | H04W 76/12 |
| 2025/0024543 | A1 * | 1/2025 | Shrivastava | H04W 80/02 |
| 2025/0039745 | A1 * | 1/2025 | Chen | H04L 5/0053 |
| 2025/0247427 | A1 * | 7/2025 | Wu | H04W 12/69 |

FOREIGN PATENT DOCUMENTS

| | | | | | |
|---|---|---|---|---|---|
| CN | 113784387 | A | * | 12/2021 | H04W 28/0268 |
| CN | 114071367 | A | * | 2/2022 | H04W 76/22 |
| CN | 114071367 | B | * | 9/2022 | H04W 76/22 |
| CN | 115379398 | A | * | 11/2022 | H04W 76/22 |
| CN | 115996359 | A | * | 4/2023 | H04W 4/06 |
| CN | 116058070 | A | * | 5/2023 | H04W 76/22 |
| CN | 116134840 | A | * | 5/2023 | H04W 76/11 |
| CN | 116783962 | A | * | 9/2023 | H04W 36/0007 |
| CN | 117941385 | A | * | 4/2024 | H04W 36/08 |
| CN | 118120334 | A | * | 5/2024 | H04W 76/40 |
| CN | 115379398 | B | * | 6/2024 | H04W 4/06 |
| CN | 118160408 | A | * | 6/2024 | H04L 12/189 |
| CN | 118202781 | A | * | 6/2024 | |
| CN | 118235441 | A | * | 6/2024 | |
| CN | 118235515 | A | * | 6/2024 | H04W 28/0268 |
| CN | 118251945 | A | * | 6/2024 | H04L 12/189 |
| CN | 119631429 | A | * | 3/2025 | H04L 47/15 |
| CN | 119678554 | A | * | 3/2025 | H04W 36/0007 |
| CN | 119999328 | A | * | 5/2025 | H04W 88/085 |
| EP | 2906009 | B1 | * | 7/2019 | H04W 76/12 |
| EP | 3562242 | A1 | * | 10/2019 | H04W 76/15 |
| EP | 3937591 | A1 | * | 1/2022 | H04W 72/20 |
| EP | 3562242 | B1 | * | 3/2022 | H04W 72/20 |
| EP | 4195711 | A1 | * | 6/2023 | H04W 76/22 |
| EP | 4233483 | B1 | * | 10/2024 | H04W 12/0431 |
| EP | 4124166 | B1 | * | 1/2025 | H04W 4/06 |
| EP | 4278676 | B1 | * | 1/2025 | H04W 36/362 |
| EP | 3641477 | B1 | * | 6/2025 | H04W 80/08 |
| EP | 4109934 | B1 | * | 9/2025 | H04W 28/24 |
| GB | 2614303 | A | * | 7/2023 | H04L 12/189 |
| GB | 2614313 | A | * | 7/2023 | H04W 36/385 |
| JP | 2020523911 | A | * | 8/2020 | H04W 76/27 |
| JP | 2023513493 | A | * | 3/2023 | H04W 76/40 |
| JP | 2024536586 | A | * | 10/2024 | H04W 72/11 |
| JP | 2024538134 | A | * | 10/2024 | H04W 28/0268 |
| JP | 2024539186 | A | * | 10/2024 | H04L 12/189 |
| JP | 2024540957 | A | * | 11/2024 | H04L 12/189 |
| JP | 2024544709 | A | * | 12/2024 | H04L 12/189 |
| JP | 2025500840 | A | * | 1/2025 | H04W 36/385 |
| JP | 2025522963 | A | * | 7/2025 | H04L 47/15 |
| JP | 7727846 | B2 | * | 8/2025 | H04W 72/11 |
| JP | 7767600 | B2 | * | 11/2025 | H04W 72/1263 |
| JP | 7767601 | B2 | * | 11/2025 | H04L 12/189 |
| JP | 7776011 | B2 | * | 11/2025 | H04W 36/385 |
| KR | 20150054896 | A | * | 5/2015 | H04W 76/15 |
| KR | 101760381 | B1 | * | 7/2017 | H04W 76/15 |
| KR | 102330739 | B1 | * | 11/2021 | H04W 28/0263 |
| KR | 102359746 | B1 | * | 2/2022 | H04W 28/0268 |
| KR | 20220016443 | A | * | 2/2022 | H04W 4/06 |
| KR | 20230007439 | A | * | 1/2023 | H04W 72/231 |
| KR | 20230110755 | A | * | 7/2023 | H04W 76/40 |
| KR | 20230131252 | A | * | 9/2023 | H04W 36/0007 |
| KR | 20240089634 | A | * | 6/2024 | H04W 72/1263 |
| KR | 20240102979 | A | * | 7/2024 | H04W 76/27 |
| KR | 102787341 | B1 | * | 3/2025 | H04W 72/231 |
| WO | 2019223780 | A1 | | 11/2019 | |
| WO | WO-2020035795 | A1 | * | 2/2020 | H04W 28/0263 |
| WO | 2020168351 | A1 | | 8/2020 | |
| WO | WO-2021157872 | A1 | * | 8/2021 | H04W 76/40 |
| WO | WO-2021218897 | A1 | * | 11/2021 | H04W 76/40 |
| WO | WO-2022028086 | A1 | * | 2/2022 | H04W 76/22 |
| WO | WO-2022086233 | A1 | * | 4/2022 | H04W 76/12 |
| WO | WO-2022087069 | A1 | * | 4/2022 | H04W 12/0431 |
| WO | WO-2022151294 | A1 | * | 7/2022 | H04W 36/0007 |
| WO | WO-2023064439 | A1 | * | 4/2023 | H04W 28/0268 |
| WO | WO-2023066188 | A1 | * | 4/2023 | H04W 76/27 |
| WO | WO-2023069375 | A1 | * | 4/2023 | H04W 76/40 |
| WO | WO-2023069381 | A1 | * | 4/2023 | H04L 12/189 |
| WO | WO-2023069388 | A1 | * | 4/2023 | H04L 12/189 |
| WO | WO-2023069481 | A1 | * | 4/2023 | H04W 4/06 |
| WO | WO-2023069709 | A1 | * | 4/2023 | H04W 76/27 |
| WO | WO-2023069746 | A1 | * | 4/2023 | H04W 36/0077 |
| WO | WO-2023120175 | A1 | * | 6/2023 | H04W 36/385 |
| WO | WO-2024015254 | A1 | * | 1/2024 | H04W 28/0268 |
| WO | WO-2024015437 | A1 | * | 1/2024 | H04W 76/27 |
| WO | WO-2024015474 | A1 | * | 1/2024 | H04W 36/0007 |

OTHER PUBLICATIONS

PCT/CN2020/112148 , "International Preliminary Report on Patentability", PCT Application Number PCT/CN2020/112148, Mar. 9, 2023, 6 pages.

PCT/CN2020/112148 , "International Search Report and Written Opinion", PCT Application No. PCT/CN2020/112148, Jun. 2, 2021, 7 pages.

* cited by examiner

METHOD AND APPARATUS FOR MULTICAST AND BROADCAST SERVICES

TECHNICAL FIELD

Embodiments of the present application generally relate to wireless communication technology, especially to a method and apparatus for multicast and broadcast services (MBS).

BACKGROUND

In new radio (NR) Rel-17, the MBS plans to focus on a small area mixed mode multicast (also referred to as Objective A in the TR 23.757). The Objective A is about enabling general MBS services over 5G system (5GS) and the identified use cases that could benefit from this feature. These use cases include but are not limited to: public safety and mission critical, vehicle to everything (V2X) applications, transparent internet protocol version 4 (IPv4)/internet protocol version 6 (IPv6) multicast delivery, internet protocol television (IPTV), software delivery over wireless, group communications and internet of things (IOT) applications. In these use cases, the requirements for service continuity and reliability have changed. In order to support the above requirements, one objective introduced in RP-201038 is: specify support for dynamic change of Broadcast/Multicast service delivery between multicast (for example, point to multipoint (PTM) mode) and unicast (for example, point to point (PTP) mode) with service continuity for a given user equipment (UE).

In addition, a NR user plane protocol which is located in the user plane of the radio network layer may be used to convey control information related to the user data flow management of a radio bearer (RB). However, how to support the user plane protocol in the case of multiple transmission modes (e.g., the PTM mode and PTP mode) in the MBS needs to be further studied.

Given the above, the industry desires an improved technology for multicast and broadcast services, so as to support the user plane protocol in the case of multiple transmission modes in the MBS.

SUMMARY OF THE APPLICATION

Embodiments of the present application at least provide a technical solution for multicast and broadcast services.

According to some embodiments of the present application, a method may include: transmitting a set of user data packet over a shared tunnel for multicast data radio bearer (M-DRB) and unicast data radio bearer (U-DRB), wherein each of the set of user data packet is associated with at least one of: a M-DRB; and one or more U-DRBs: and receiving a data delivery status frame for each of the at least one of the M-DRB and one or more U-DRBs.

According to some other embodiments of the present application, a method may include: receiving a set of user data packet over a shared tunnel for M-DRB and U-DRB, wherein each of the set of user data packet is associated with at least one of: a M-DRB: and one or more U-DRBs: and transmitting a data delivery status frame for each of the at least one of the M-DRB and one or more U-DRBs.

According to some other embodiments of the present application, a method may include: transmitting an indication requiring uplink (UL) transport network layer (TNL) information of at least one feedback tunnel for data delivery status frame, wherein the at least one feedback tunnel is associated with at least one of a M-DRB and one or more U-DRBs.

Some embodiments of the present application also provide an apparatus, include: at least one non-transitory computer-readable medium having computer executable instructions stored therein, at least one receiver: at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present application provide a technical solution for multicast and broadcast services, which can at least support the user plane protocol in the case of multiple transmission modes in the MBS.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present application are also applicable to similar technical problems.

Figure 1:
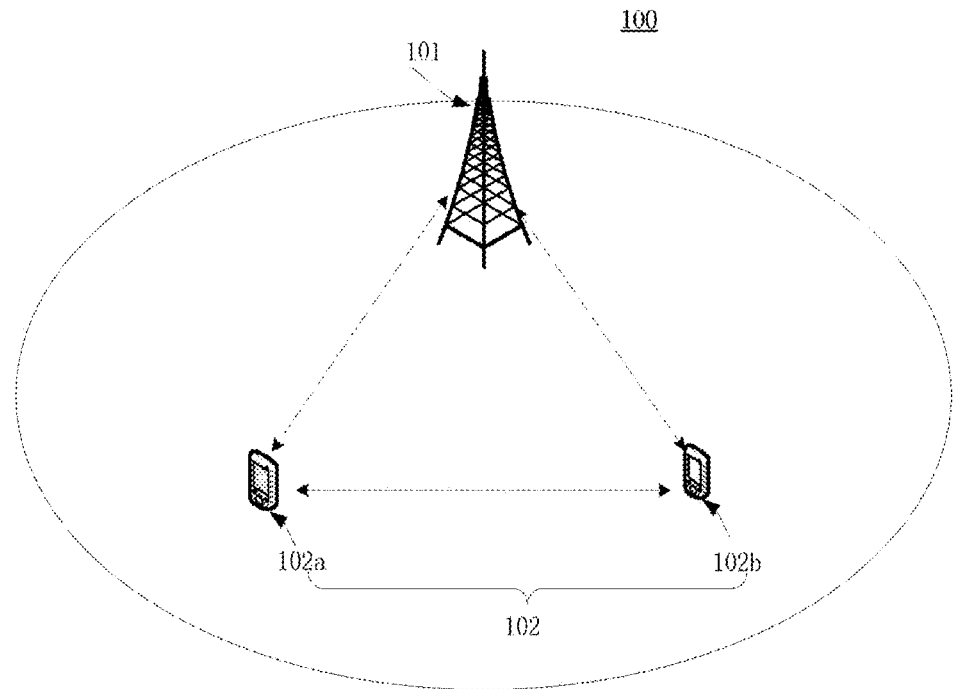
FIG. 1 is a schematic diagram illustrating an exemplary wireless communication system according to some embodiments of the present application.

FIG. 1 is a schematic diagram illustrating an exemplary wireless communication system 100 according to an embodiment of the present application.

As shown in FIG. 1, a wireless communication system 100 includes at least one BS 101 and at least one UE 102. In particular, the wireless communication system 100 includes one BS 101 and two UEs 102 (e.g., a UE 102a and UE 102b) for illustrative purpose. Although a specific number of BS 101 and UEs 102 are depicted in FIG. 1, it is contemplated that any number of BSs 101 and UEs 102 may be included in the wireless communication system 100.

The BS 101 may also be referred to as an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

The UE(s) 102 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 102(s) may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 102(s) may include wearable devices, such as smart watches, fitness bands, optical head-mounted displays, or the like. Moreover, the UE 102(s) may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

Figure 2:
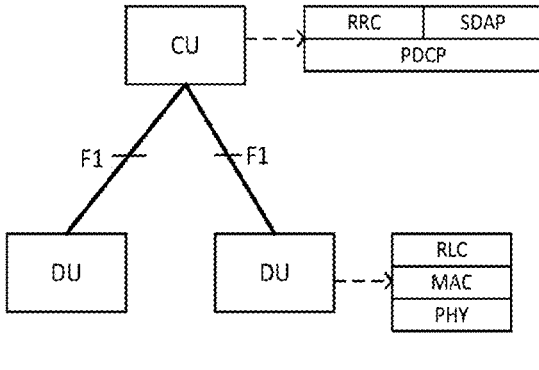
FIG. 2 is a schematic diagram illustrating an internal structure of a BS according to some embodiments of the present application.

FIG. 2 is a schematic diagram illustrating an internal structure of a BS according to some embodiments of the present application.

Referring to FIG. 2, the internal structure of a BS (e.g., the BS 101 in FIG. 1) may be split into a central unit (CU) and at least one distributed unit (DU) (e.g., two DUs shown in FIG. 2). Although a specific number of DUs are depicted in FIG. 2, it is contemplated that any number of DUs may be included in the BS.

The CU and DU are connected with each other by an interface called F1 as specified in 3GPP standard documents. The radio resource control (RRC) layer functionality, service data adaptation protocol (SDAP) functionality, and the packet data convergence protocol (PDCP) layer functionality are included in the CU. The radio link control (RLC) layer functionality, medium access control (MAC) layer functionality, and the physical (PHY) layer functionality are included in the DU.

According to some embodiments of the present application, the CU may be separated into a central unit control plane (CU-CP) unit and at least one central unit user plane (CU-UP) unit. For example, FIG. 3 is a schematic diagram illustrating an internal structure of a BS according to some other embodiments of the present application.

Figure 3:
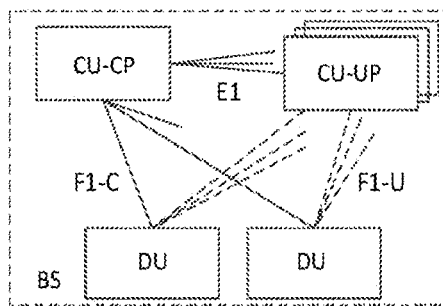
FIG. 3 is a schematic diagram illustrating an internal structure of a BS according to some other embodiments of the present application.

Referring to FIG. 3, the CU may be separated into a CU-CP unit and at least one CU-UP unit. The CU-CP unit and each CU-UP unit may be connected with each other by an interface called E1 as specified in 3GPP standard documents. The CU-CP unit and the DU are connected by an interface called F1-C as specified in 3GPP documents. Each CU-UP unit and the DU are connected by an interface called F1-U as specified in 3GPP standard documents.

A NR user plane protocol is located in the user plane of the radio network layer over either the Xn interface or the X2 interface or the F1 interface as specified in 3GPP standard documents. The NR user plane protocol may be used to convey control information related to the user data flow management of data radio bearers. Each NR user plane protocol instance is associated to one data radio bearer only. In addition, there is one NR user plane protocol instance per a general packet radio service (GPRS) tunneling protocol (GTP) user plane (GTP-U) tunnel.

Figure 4:
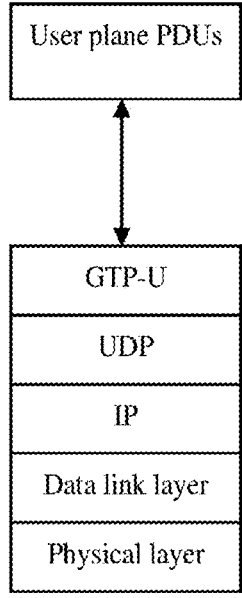
FIG. 4 is a schematic diagram illustrating an user plane protocol according to some embodiments of the present application.

For example, FIG. 4 is a schematic diagram illustrating a user plane protocol according to some other embodiments of the present application.

Referring to FIG. 4, the user plane protocol may include a physical layer, a data link layer, an internet protocol layer, a user datagram protocol layer, a GTP-U layer, and a user plane protocol layer. In the GTP-U layer, the user plane protocol data unit (PDU) in the user plane protocol layer may be included in the GTP-U extension header (also referred to as "NR radio access network (RAN) container") as specified in 3GPP standard document TS 29.281.

The user plane protocol layer may be used for flow control of user data packets transferred from the node hosting PDU (e.g., the CU or the CU-UP) to the corresponding node (e.g., the DU). For example, the user plane protocols may include the following information:

Information of successful in sequence delivery of PDCP PDUs to the UE from the corresponding node for user data associated with a specific data radio bearer Information of the currently desired buffer size at the corresponding node for transmitting to the UE user data associated with a specific data radio bearer User plane specific sequence number information for user data transferred from the node hosting PDCP to the corresponding node for a specific data radio bearer.

In 5G MBS, a BS may transmit the same MBS data to different UEs. For example, the BS 101 may transmit the same MBS data to the UE 102a and UE 102b in FIG. 1 via a PTM mode. In another example, the same MBS data may be respectively transmitted to the UE 102a and UE 102b via a unicast mode (i.e., the PTP mode). According to some embodiments of the present application, a shared tunnel (e.g., one single GTP-U tunnel) may be established between CU/CU-CP and DU for data transmission of both M-DRB and U-DRB.

Figure 5:
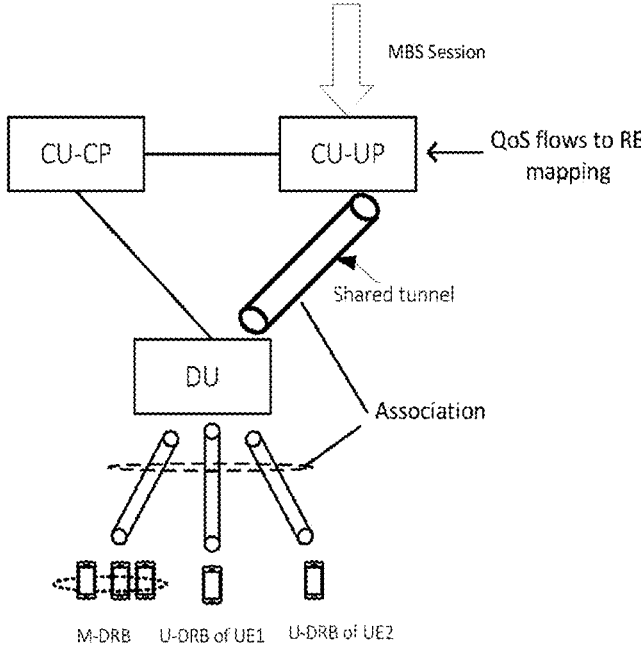
FIG. 5 is a schematic diagram illustrating a data transmission on a shared tunnel according to some embodiments of the present application.

For example, FIG. 5 is a schematic diagram illustrating a data transmission on a shared tunnel according to some embodiments of the present application.

Referring to FIG. 5, the internal structure of a BS is split into a CU-CP unit, a CU-UP unit, and a DU. When an MBS session arrives at the CU-UP from the core network, the CU-UP may map the MBS session into one or more RBs. The mapping is performed by a QoS flow to RB mapping in the SDAP layer. For example, at least one QoS flow of the session may be mapped to a RB.

For each RB, a GTP-U tunnel may be established between a CU-UP and a DU for data transmission via M-DRB, U-DRB of UE1 (for example, the UE 102a), and U-DRB of UE2 (for example, the UE 102b).

The M-DRB may refer to a radio bearer or an RLC bearer for data transmission via a PTM mode. The M-DRB is scrambled by a group radio network temporary identifier (G-RNTI) in at least one cell. The M-DRB can also be named as multicast radio bearer (MRB). The U-DRB may refer to a radio bearer or an RLC bearer for data transmission via a PTP mode. The U-DRB is scrambled by a cell radio network temporary identifier (C-RNTI). The U-DRB can also be named as data radio bearer (DRB). The M-DRB may refer to a radio bearer in a PTM mode while the U-DRB may refer to a radio bearer in a PTP mode.

Since the tunnel is used for data transmission via M-DRB, U-DRB of UE1, and U-DRB of UE2, the tunnel may be also referred to a shared tunnel or a common tunnel in some embodiments of the present application.

As stated above, the NR user plane protocol layer may be used for flow control of user data packets between CU/CU-CP and DU. However, in the existing technology, each NR user plane protocol instance is associated with one data radio bearer only. That is, there is one NR user plane instance per GTP tunnel.

Given the above, how to support the user plane protocol in the case that a shared tunnel is used for both M-DRB and U-DRB(s) needs to be solved. In other words, the existing user plane protocol is used for a specific data radio bearer of a UE, and how to design a user plane protocol for a shared data radio bearer (or shared tunnel) needs to be solved.

Embodiments of the present application provide a technical solution for MBS, which can at least support the user plane protocol in the case that a shared tunnel is used for M-DRB and U-DRB(s). More details on embodiments of the present application will be illustrated in the following text in combination with the appended drawings.

Figure 6:
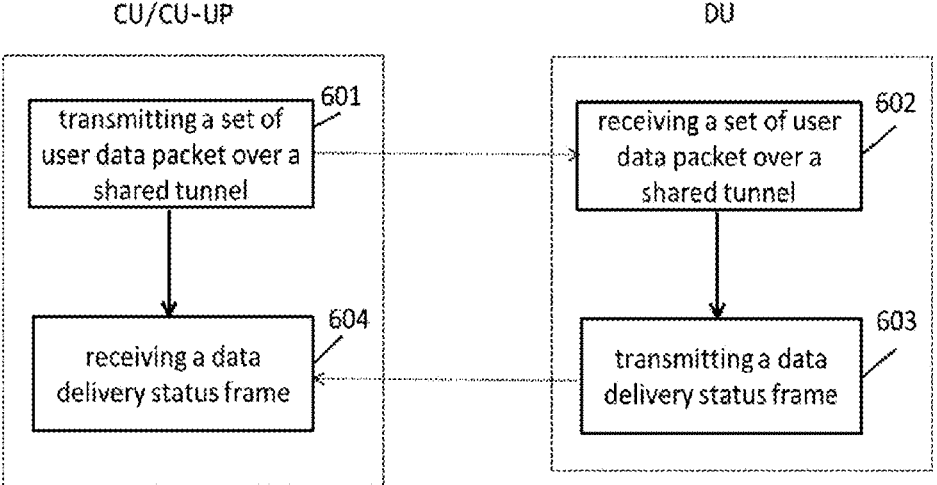
FIG. 6 is a flow chart illustrating a method for MBS according to some embodiments of the present application.

FIG. 6 is a flow chart illustrating a method for MBS according to some embodiments of the present application. Although the method is illustrated in a system level by a CU or CU-UP (e.g., the CU shown in FIG. 2 and CU-UP shown in FIG. 3) and a DU (e.g., the DU in FIG. 2 or FIG. 3), persons skilled in the art can understand that the method implemented in the CU or CU-UP (CU/CU-UP) and that implemented in the DU can be separately implemented and incorporated by other apparatus with the like functions.

In the exemplary method shown in FIG. 6, at step 601, the CU or the CU-UP may transmit a set of user data packet over a shared tunnel for M-DRB and U-DRB, wherein each of the set of user data packet is associated with at least one of: a M-DRB, and one or more U-DRBs. The set of user data packet may include one or more user data packets. According to some embodiments of the present application, each user data packet of the set of user data packet may be a PDCP PDU.

In an embodiment of the present application, the CU or the CU-UP may transmit a user data frame to the DU. The user data frame may be referred to as protocol data unit (PDU) type 0 as specified in 3GPP standard document TS 38.425. The user data frame may be defined to allow the DU to detect the lost packets of the set of user data packet and is associated with the transfer of a PDCP PDU. The user data frame is carried by the user data protocol.

At step 602, the DU may receive the set of user data packet over a shared tunnel for M-DRB and U-DRB. After receiving the set of user data packet, at step 603, the DU may transmit a data delivery status frame for each of the at least one of the M-DRB and one or more U-DRBs. The data delivery status frame may be deemed as feedback information for the set of user data packet. In an embodiment of the present application, the data delivery status frame may be referred to as PDU type 1 as specified in 3GPP standard document TS 38.425. The data delivery status frame may be defined to transfer feedback to allow the CU or CU-UP to control the downlink user data flow via the DU. Consequently, at step 604, the CU or CU-UP may receive the data delivery status frame for each of the at least one of the M-DRB and one or more U-DRBs.

According to some embodiments of the present application, the data delivery status frame for each of the at least one of the M-DRB and one or more U-DRBs may be transmitted or received in separated feedback tunnels. For example, FIG. 7 illustrates an example of transmitting a data delivery status frame on separated feedback tunnels according to some other embodiments of the present application.

Figure 7:
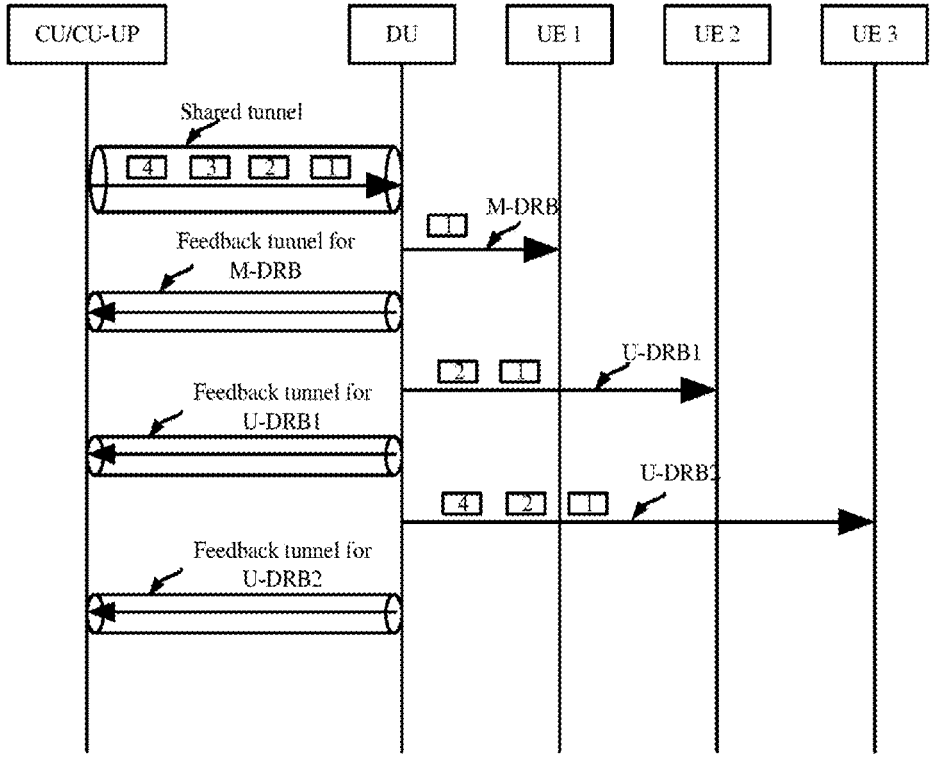
FIG. 7 illustrates an example of transmitting a data delivery status frame on separated feedback tunnels according to some other embodiments of the present application.

Referring to FIG. 7, a shared tunnel may be established between the CU/CU-UP and the DU of a base station (e.g., a BS 101 in FIG. 1). The shared tunnel may be used for both M-DRB and U-DRB, e.g., M-DRB, U-DRB1, and U-DRB2.

A set of user data packets (e.g., user data packet 1, 2, 3, and 4) are transmitted from the CU/CU-UP to the DU via the shared tunnel. The DU may transmit each data packet of the set of user data packets to UE 1 via M-DRB, transmit each data packet of the set of user data packets to UE 2 via U-DRB1, and transmit each data packet of the set of user data packets to the UE 3 via U-DRB2. That is, each of the set of user data packets is associated with M-DRB, U-DRB1 and U-DRB2.

For each of the M-DRB, U-DRB1, and U-DRB2, the DU may transmit a data delivery status frame to the CU/CU-UP. Each data delivery status frame may indicate a data delivery status for the set of user data packets transmitted to UE1, UE2, and UE3, respectively.

As shown in FIG. 7, the data delivery status frame for the M-DRB may be transmitted via a separated feedback tunnel for M-DRB. In an embodiment of the subject application, the data delivery status frame may indicate a highest successfully delivered packet sequence number. In the example of FIG. 7, only packet 1 is successfully delivered to UE 1, then the highest successfully delivered packet sequence number is 1, and the data delivery status frame for M-DRB may indicate the sequence number "1."

Similarly, the data delivery status frame for U-DRB1 may be transmitted via a separated feedback tunnel for U-DRB1. In the example of FIG. 7, packets 1 and 2 are successfully delivered to UE 2, then the highest successfully delivered packet sequence number is 2, and the data delivery status frame for U-DRB1 may indicate the sequence number "2."

The data delivery status frame for U-DRB2 may be transmitted via a separated feedback tunnel for U-DRB2. In the example of FIG. 7, packets 1, 2 and 4 are successfully delivered to UE 3, then the highest successfully delivered packet sequence number is 2, and then the data delivery status frame for U-DRB2 may indicate the sequence number "2."

Figure 8:
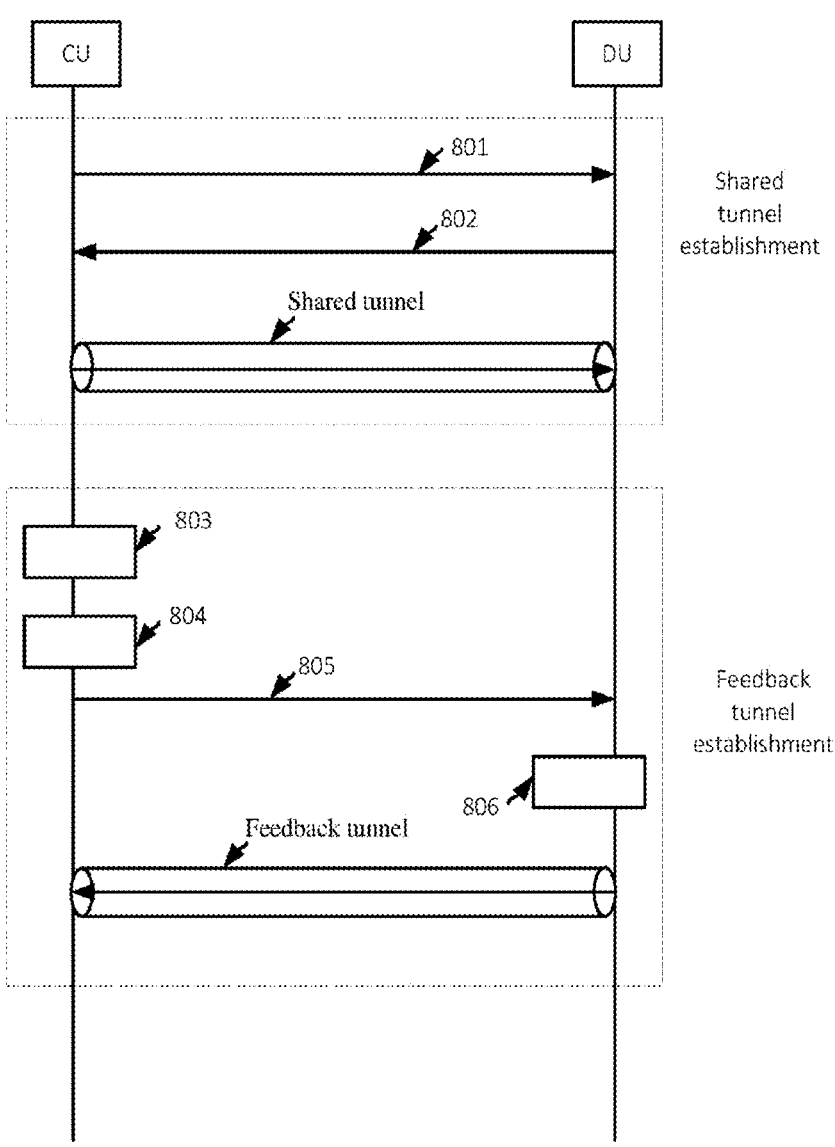
FIG. 8 is a flow chart illustrating a method for establishing separated feedback tunnels according to some embodiments of the present application.

FIG. 8 is a flow chart illustrating a method for establishing separated feedback tunnels according to some embodiments of the present application.

Referring to FIG. 8, after receiving an MBS session setup request from the core network (not shown in FIG. 8), the CU of a BS (e.g., the BS 101) may perform a QoS flow to RB mapping and decide to establish a tunnel for a RB. In an embodiment of the present application, the tunnel may be a GTP-U tunnel. The tunnel may be used for both the M-DRB and U-DRB, and accordingly, the tunnel may be also referred to a shared tunnel or a common tunnel.

An exemplary shared tunnel establishment procedure may mainly include step 801 and step 802.

According to some embodiments of the present application, the CU may generate a bearer context ID. At step 801, the CU may transmit a bearer context ID to the DU of the BS for establishing a shared tunnel for RB. The bearer context ID is used to identify a tunnel for RB and associate the tunnel with at least one of: a M-DRB and one or more U-DRBs.

After receiving the bearer context ID, at step 802, the DU may transmit downlink (DL) TNL information of the tunnel to the CU. In an embodiment, the DL TNL information of the tunnel is to identify a shared tunnel for data transmission of the M-DRB and the one or more U-DRBs. In another embodiment, the DL TNL information indicates an IP address and GTP-U tunnel endpoint identifier (TEID). After the CU receives the DL TNL information of the shared tunnel, the shared tunnel for M-DRB and U-DRB between the CU and the DU is established.

In an embodiment of the present application, at step 801, the CU may transmit the bearer context ID in a bearer context setup request message to the DU. After receiving the bearer context setup request message, at step 802, the DU may transmit a bearer context setup response message to the CU, which includes the DL TNL information of the tunnel. According to another embodiment of the present application, the bearer context setup request message further indicates at least one of: an MBS session ID, a temporary mobile group identity (TMGI), an ID of a RB, and QoS parameter(s) for the RB.

According to some other embodiments of the present application, the DU, rather than the CU may generate the bearer context ID. In these embodiments, at step 801, the CU may transmit a bearer context setup request message to the DU. The bearer context setup request message does not include the bearer context ID, while is used to indicate the DU to generate a bearer context ID and establish a tunnel between the CU and the DU. In an embodiment of the present application, the bearer context setup request message further indicates at least one of: an MBS session ID, a TMGI, an ID of a RB, and QoS parameter(s) for the RB.

After receiving the bearer context setup request message, at step 802, the DU may transmit a bearer context setup response message to the CU. In an embodiment, the bearer context setup response message may include a bearer context ID and DL TNL information of the tunnel. In another embodiment, the bearer context ID is indicated in DL TNL information of the tunnel. In yet another embodiment, the DL TNL information may even be used as the bearer context ID. In this case, the bearer context setup response message may include the DL TNL information of the tunnel as the bearer context ID. In yet another embodiment, the DL TNL information indicates an IP address and a GTP-U TEID. After the CU receives the DL TNL information of the shared tunnel, the shared tunnel for M-DRB and U-DRB between the CU and the DU is established.

After establishing the shared tunnel between the CU and the DU, the CU may transmit a set of user data packet (e.g. a set of PDCP PDUs) over the shared tunnel using the DL TNL information. According to some embodiments of the present application, in addition to the set of user data packet, the CU may also transmit the user data frame over the shared tunnel using the DL TNL information. Each of the set of user data packet is associated with at least one of: a M-DRB: and one or more U-DRBs. Then, the DU may transmit data delivery status frame for each of the at least one of the M-DRB and one or more U-DRBs over separated feedback tunnels.

According to some other embodiments of the present application, the CU and the DU may establish a corresponding feedback tunnel for each of the at least one of the M-DRB and one or more U-DRBs associated with the shared tunnel.

For example, an exemplary procedure for establishing a corresponding feedback tunnel for a M-DRB or a U-DRB may mainly include steps 803-806 in FIG. 8.

In an exemplary feedback tunnel establishment procedure for M-DRB, at step 803, the CU may allocate uplink (UL) TNL information of the feedback tunnel for M-DRB. In an embodiment of the present application, the UL TNL information indicates an IP address and a GTP-U TEID.

At step 804, the CU may associate the UL TNL information of the feedback tunnel with the bearer context ID of the shared tunnel.

At step 805, the CU may transmit the UL TNL information of the feedback tunnel to the DU. Step 805 may occur simultaneously with step 804, before step 804, or after step 804. According to some embodiments of the present application, at step 805, the CU may transmit the UL TNL information of the feedback tunnel in a M-DRB setup request message. In an embodiment of the present application, the M-DRB setup request message may include at least one of: a M-DRB ID and the bearer context ID of the shared tunnel.

After receiving the UL TNL information of the feedback tunnel, at step 806, the DU may associate the UL TNL information of the feedback tunnel with the bearer context ID of the shared tunnel, which means that the feedback tunnel for M-DRB is established. Then, the DU may transmit data delivery status frame for the M-DRB via the feedback tunnel for M-DRB by using the UL TNL information.

For example, the DU may receive the set of user data packet from the shared tunnel identified by the DL TNL information as well as the user data frame which provides the user plane control information. With respect to the data delivery status frame for the M-DRB, the DU may transmit it in the feedback tunnel for the M-DRB identified by the UL TNL information. When the CU receives the data delivery status frame via the M-DRB identified by the UL TNL information, the CU knows that the data delivery status frame is for the M-DRB associated with the set of user data packet over the shared tunnel.

An exemplary feedback tunnel establishment procedure for a U-DRB may be similar to that for M-DRB. For example, in an exemplary feedback tunnel establishment procedure for a U-DRB, at step 803, the CU may allocate UL TNL information of the feedback tunnel for the U-DRB. At step 804, the CU may associate the UL TNL information of the feedback tunnel with the bearer context ID of the shared tunnel. At step 805, the CU may transmit the UL TNL information of the feedback tunnel to the DU. Step 805 may occur simultaneously with step 804, before step 804, or after step 804. According to some embodiments of the present application, at step 805, the CU may transmit the UL TNL information of the feedback tunnel in a U-DRB setup request message. In an embodiment of the present application, the U-DRB setup request message may include at least one of: a U-DRB ID and the bearer context ID of the shared tunnel. After receiving the UL TNL information of the feedback tunnel, at step 806, the DU may associate the UL TNL information of the feedback tunnel with the bearer context ID of the shared tunnel, which means that the feedback tunnel for the U-DRB is established. Then, the DU may transmit data delivery status frame for the U-DRB via the feedback tunnel for the U-DRB.

The example in FIG. 8 illustrates that the feedback tunnels for the M-DRB and U-DRB are established in separated procedures. However, according to some other embodiments of the present application, the CU and the DU may establish the feedback tunnels for the M-DRB and U-DRB together in one procedure. In this case, at step 803, the CU may generate respective UL TNL information for the M-DRB and one or more U-DRBs, associate the respective UL TNL information for the M-DRB and one or more U-DRBs with the bearer context ID of the shared tunnel at step 804, and transmit the respective UL TNL information for the M-DRB and one or more U-DRBs to the DU at step 805 such that the DU may associate UL TNL information respectively for the M-DRB and one or more U-DRBs with the bearer context ID of the shared tunnel at step 806.

In addition, FIG. 8 illustrates that the feedback tunnel may be established after establishing the shared tunnel. In fact, some steps in the feedback tunnel establishment procedure may occur simultaneously with, before, or after some steps in the shared tunnel establishment procedure as long as the feedback tunnels can be established successfully.

Figure 9:
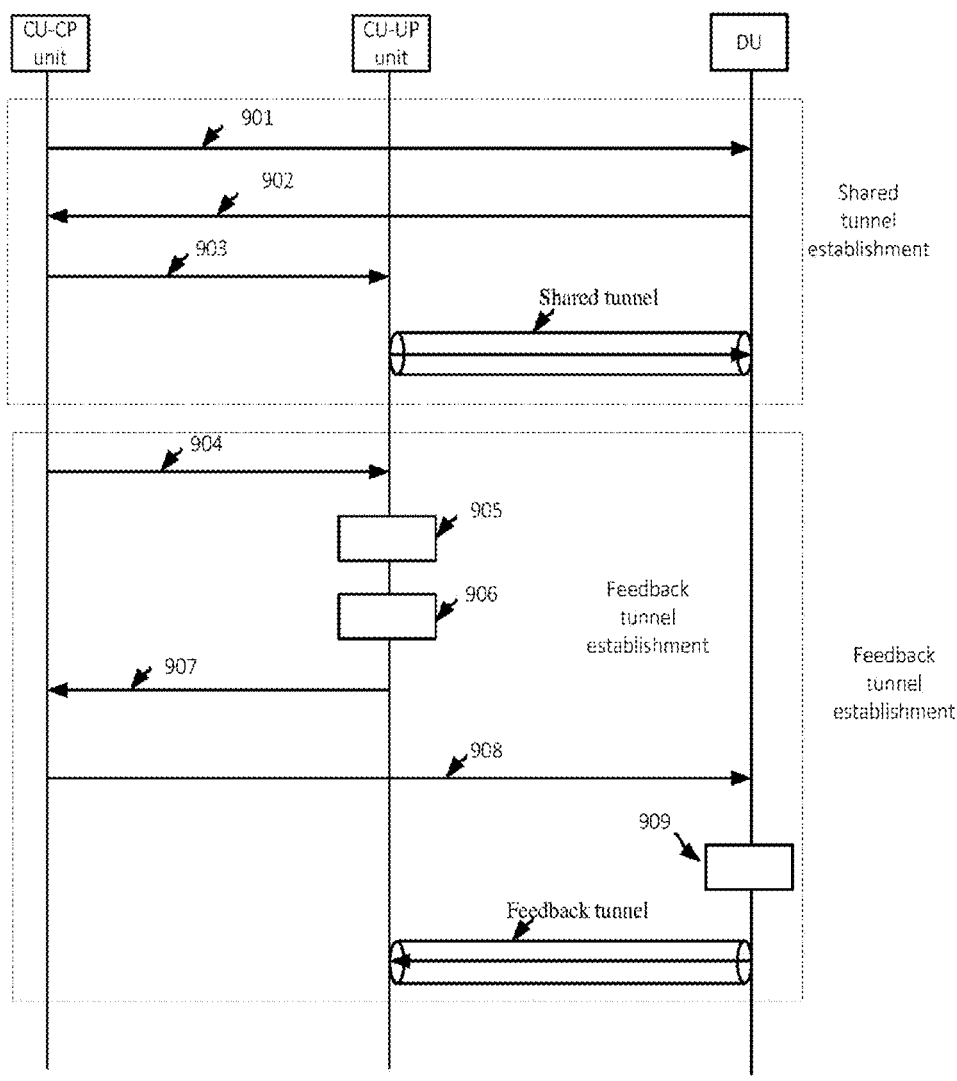
FIG. 9 is a flow chart illustrating a method for establishing separated feedback tunnels according to some other embodiments of the present application.

FIG. 9 is a flow chart illustrating a method for establishing separated feedback tunnels according to some other embodiments of the present application, wherein the internal structure of a CU is considered.

After receiving an MBS session setup request from the core network (not shown in FIG. 9), the CU-CP unit of a BS (e.g., the BS 101) may perform a Qos flow to RB mapping procedure and decide to establish a tunnel for RB. In an embodiment of the present application, the tunnel may be a GTP-U tunnel. The tunnel may be used for both the M-DRB and the U-DRB, and accordingly, the tunnel may be also referred to a shared tunnel or a common tunnel.

An exemplary shared tunnel establishment procedure may mainly include step 901, step 902, and step 903.

According to some embodiments of the present application, the CU-CP unit may generate a bearer context ID for the shared tunnel.

Then, at step 901, the CU-CP unit may transmit a bearer context ID to the DU. The bearer context ID is used to identify a shared tunnel for a RB and associate the shared tunnel with at least one of: a M-DRB and one or more U-DRBs.

After receiving the bearer context ID, at step 902, the DU may transmit DL TNL information of the shared tunnel to the CU-CP unit. In an embodiment, the DL TNL information of the tunnel is to identify a shared tunnel for data transmission of the M-DRB and one or more U-DRBs. In another embodiment, the DL TNL information indicates an IP address and GTP-U TEID.

According to an embodiment of the present application, at step 901, the CU-CP unit may transmit the bearer context ID in a first bearer context setup request message to the DU. After receiving the first bearer context setup request message, at step 902, the DU may transmit a first bearer context setup response message to the CU-CP unit, which includes the DL TNL information of the shared tunnel. According to another embodiment of the present application, the first bearer context setup request message further indicates at least one of: an MBS session ID, a TMGI, an ID of a RB, and QoS parameter(s) for the RB.

After receiving the DL TNL information of the shared tunnel, at step 903, the CU-CP unit may transmit the DL TNL information to the CU-UP unit.

According to an embodiment of the present application, at step 903, the CU-CP unit may transmit the DL TNL information in a second bearer context setup request message to the CU-UP unit. In an embodiment of the present application, the second bearer context setup request message may also include the bearer context ID. After receiving the DL TNL information of the shared tunnel by the CU-UP unit, the shared tunnel between the CU-UP unit and the DU is established.

According to some other embodiments of the present application, the bearer context ID may be generated by the DU.

For example, at step 901, the CU-CP unit may transmit a first bearer context setup request message to the DU. The first bearer context setup request message does not include the bearer context ID, while is used to indicate the DU to generate a bearer context ID for the shared tunnel between the CU-UP unit and the DU. In an embodiment of the present application, the first bearer context setup request message further indicates at least one of: an MBS session ID, a TMGI, an ID of a RB, and QoS parameter(s) for the RB.

After receiving the first bearer context setup request message, as a response, at step 902, the DU may transmit a first bearer context setup response message to the CU-CP unit. In an embodiment, the bearer context setup response message may include a bearer context ID and DL TNL information of the tunnel. In another embodiment, the bearer context ID is indicated in DL TNL information of the tunnel, for example, the DL TNL information may be used as the bearer context ID. Therefore, the bearer context setup response message may include the DL TNL information of the tunnel as the bearer context ID. In yet another embodiment, the DL TNL information indicates an IP address and a GTP-U TEID.

After receiving the bearer context ID and the TNL information of the tunnel by the CU-CP unit, at step 903, the CU-CP unit may transmit the bearer context ID and the TNL information of the tunnel to the CU-UP unit. In an embodiment of the present application, the CU-CP unit may transmit the TNL information as the bearer context ID at step 903.

In an embodiment of the present application, at step 903, the CU-CP unit may transmit the above information in a second bearer context setup request message to the CU-UP unit. In another embodiment of the present application, the second bearer context setup request message further indicates at least one of: a mapping between at least one QoS flow and a RB, an MBS session ID, a TMGI, an ID of the RB, and QoS parameter(s) for the RB.

After receiving the DL TNL information of the tunnel by the CU-UP unit, the tunnel between the CU-UP unit and the DU is established.

After establishing the shared tunnel between the CU-UP unit and the DU, the CU-UP unit may transmit a set of user data packet(s) (e.g. PDCP PDU) over the shared tunnel using the DL TNL information. According to some embodiments of the present application, in addition to the set of user data packet, the CU-UP unit may also transmit the user data frame over the shared tunnel using the DL TNL information. Each of the set of user data packet is associated with at least one of: a M-DRB, and one or more U-DRBs. Then, the DU may transmit data delivery status frame for each of the at least one of the M-DRB and one or more U-DRBs over separated feedback tunnels to the CU-UP unit.

According to some other embodiments of the present application, the CU-UP and the DU may establish a corresponding feedback tunnel for each of the at least one of the M-DRB and one or more U-DRBs associated with the shared tunnel.

For example, an exemplary procedure for establishing a corresponding feedback tunnel for each of the at least one of the M-DRB and one or more U-DRBs associated with the shared tunnel may mainly include steps 904-909 in FIG. 9.

At step 904, the CU-CP unit may transmit an indication requiring UL TNL information of at least one feedback tunnel for data delivery status frame to the CU-UP unit. The at least one feedback tunnel may be associated with at least one of a M-DRB and one or more unicast data radio bearer U-DRBs associated with the shared tunnel. In an embodiment of the present application, the UL TNL information may indicate an IP address and a GTP-U TEID.

According to some embodiments of the present application, the indication at step 904 may require the UL TNL information of one feedback tunnel associated with the M-DRB. In an embodiment of the present application, at step 904, the CU-CP unit may transmit the indication in a first M-DRB setup request message. In an embodiment of the present application, the first M-DRB setup request message may include at least one of: a M-DRB ID and the bearer context ID of the shared tunnel.

After receiving the indication, at step 905, the CU-UP unit may allocate the UL TNL information of the feedback tunnel for the M-DRB. In an embodiment of the present application, the UL TNL information indicates an IP address and a GTP-U TEID.

At step 906, the CU-UP unit may associate the UL TNL information of the feedback tunnel with the bearer context ID of the shared tunnel.

At step 907, the CU-UP unit may transmit the UL TNL information of the feedback tunnel to the CU-CP unit. Step 907 may occur simultaneously with step 906, before step 906, or after step 906. According to some embodiments of the present application, at step 907, the CU-UP unit may transmit the UL TNL information of the feedback tunnel in a first M-DRB setup response message.

After receiving the UL TNL information of the feedback tunnel, at step 908, the CU-CP unit may transmit the UL TNL information to the DU. According to some embodiments of the present application, at step 908, the CU-CP unit may transmit the UL TNL information in a second M-DRB setup request message. In an embodiment of the present application, the second M-DRB setup request message may include at least one of: a M-DRB ID and the bearer context ID of the shared tunnel.

After receiving the UL TNL information, at step 909, the DU may associate the UL TNL information of the feedback tunnel with the bearer context ID of the shared tunnel, which means that the feedback tunnel for the M-DRB is established. Then, the DU may transmit data delivery status frame for the M-DRB via the feedback tunnel for the M-DRB by using the UL TNL information.

According to some embodiments of the present application, the indication at step 904 may require the UL TNL information of one feedback tunnel associated with one U-DRB, e.g., U-DRB1 or U-DRB2. In an embodiment of the present application, at step 904, the CU may transmit the indication in a first U-DRB setup request message. In an embodiment of the present application, the first U-DRB setup request message may include at least one of: a U-DRB ID and the bearer context ID of the shared tunnel.

After receiving the indication, at step 905, the CU-UP unit may allocate the UL TNL information of the feedback tunnel for the U-DRB. In an embodiment of the present application, the UL TNL information indicates an IP address and a GTP-U TEID.

At step 906, the CU-UP unit may associate the UL TNL information of the feedback tunnel with the bearer context ID of the shared tunnel.

At step 907, the CU-UP unit may transmit the UL TNL information of the feedback tunnel to the CU-CP unit. Step 907 may occur simultaneously with step 906, before step 906, or after step 906. According to some embodiments of the present application, at step 907, the CU-UP unit may transmit the UL TNL information of the feedback tunnel in a first U-DRB setup response message.

After receiving the UL TNL information of the feedback tunnel, at step 908, the CU-CP unit may transmit the UL TNL information to the DU. According to some embodiments of the present application, at step 908, the CU-CP unit may transmit the UL TNL information in a second U-DRB setup request message. In an embodiment of the present application, the second U-DRB setup request message may include at least one of: a U-DRB ID and the bearer context ID of the shared tunnel.

After receiving the UL TNL information, at step 909, the DU may associate the UL TNL information of the feedback tunnel with the bearer context ID of the shared tunnel, which means that the feedback tunnel for the U-DRB is established. Then, the DU may transmit data delivery status frame for the U-DRB via the feedback tunnel for the U-DRB by using the UL TNL information.

According to some embodiments of the present application, the indication at step 904 may require UL TNL information for at least one feedback tunnel, wherein each feedback tunnel of the at least one tunnel is associated with a corresponding data radio bearer (DRB) of the at least one of the M-DRB and one or more U-DRBs. Then, at step 905, the CU-UP unit may allocate UL TNL information for each feedback tunnel of the at least one feedback tunnel. At step 906, the CU-UP unit may associate the UL TNL information for each feedback tunnel with the bearer context ID of the shared tunnel. At step 907, the CU-UP unit may transmit the UL TNL information for each feedback tunnel to the CU-CP unit. After receiving the UL TNL information for each feedback tunnel, at step 908, the CU-CP unit may transmit the UL TNL information for each feedback tunnel to the DU such that the DU may associate the UL TNL information for each feedback tunnel with the bearer context ID of the shared tunnel at step 909. According to some embodiments, the M-DRB ID and/or a U-DRB ID for each U-DRB may be transmitted together with the indication.

For example, assuming that the shared tunnel is associated with M-DRB, U-DRB1, and U-DRB2, the indication may require UL TNL information for a first feedback tunnel for the M-DRB, a second feedback tunnel for U-DRB1, and a third feedback tunnel for U-DRB2. The CU-UP may generate the UL TNL information for each feedback tunnel of the three feedback tunnels to the CU-CP unit at step 905, associate UL TNL information for each feedback tunnel with the bearer context ID of the shared tunnel, and transmit the UL TNL information for each feedback tunnel to the CU-UP. At step 908, the CU-CP unit may transmit the UL TNL information for each feedback tunnel to the DU such that the DU may associate the UL TNL information for each feedback tunnel with the bearer context ID of the shared tunnel at step 909.

According to some embodiments of the present application, the indication at step 904 may require a plurality of feedback tunnels for a plurality of U-DRBs, each feedback tunnel of the plurality of feedback tunnels is associated with a corresponding U-DRB of the plurality of U-DRBs. Then, at step 905, the CU-UP unit may allocate UL TNL information for each feedback tunnel of the plurality of feedback tunnels for a plurality of U-DRBs. At step 906, the CU-UP unit may associate the UL TNL information for each feedback tunnel with the bearer context ID of the shared tunnel. At step 907, the CU-UP unit may transmit the UL TNL information for each feedback tunnel to the CU-CP unit. After receiving the UL TNL information for each feedback tunnel, at step 908, the CU-CP unit may transmit the UL TNL information for each feedback tunnel to the DU such that the DU may associate the UL TNL information for each feedback tunnel with the bearer context ID of the shared tunnel at step 909.

According to some embodiments of the present application, the data delivery status frame for each of the at least one of the M-DRB and one or more U-DRBs may be transmitted in a single feedback tunnel. For example, FIG. 10 illustrates an example of transmitting a data delivery status frame on a single feedback tunnel according to some other embodiments of the present application.

Figure 10:
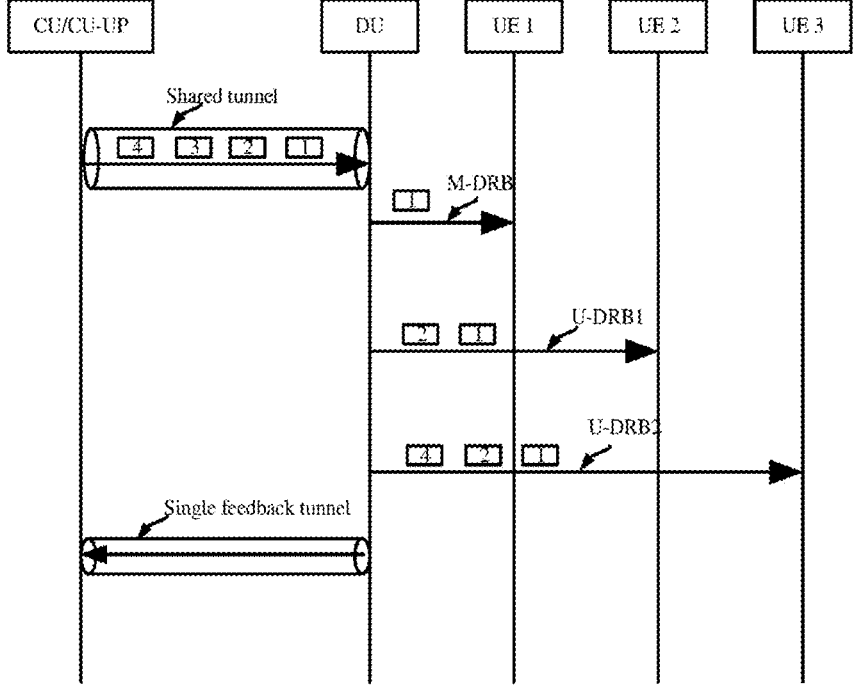
FIG. 10 illustrates an example of transmitting a data delivery status frame on a single feedback tunnel according to some other embodiments of the present application.

The main difference between FIG. 10 and FIG. 7 is that all of the data delivery status frames for the M-DRB, U-DRB1, and U-DRB2 are transmitted via a single feedback tunnel.

Accordingly, some adaptive changes can be made to the exemplary tunnel establishing procedure in steps 803-806 in FIG. 8 to achieve a single feedback tunnel.

For example, at step 803, the CU may allocate UL TNL information of the single feedback tunnel. In an embodiment of the present application, the UL TNL information indicates an IP address and a GTP-U TEID.

At step 804, the CU may associate the UL TNL information of the feedback tunnel with the bearer context ID of the shared tunnel.

At step 805, the CU may transmit the UL TNL information of the single feedback tunnel to the DU. Step 805 may occur simultaneously with step 804, before step 804, or after step 804.

According to some embodiments of the present application, at step 805, the CU may transmit the UL TNL information of the single feedback tunnel in a setup request message. In an embodiment of the present application, the setup request message may include at least one of: a M-DRB ID, one or more U-DRB IDs, and the bearer context ID of the shared tunnel.

After receiving the UL TNL information of the feedback tunnel, at step 806, the DU may associate the UL TNL information of the single feedback tunnel with the bearer context ID of the shared tunnel, which means that the single feedback tunnel for the M-DRB is established.

Similarly, in the case that the internal structure of a CU is considered, some adaptive changes can be made to the exemplary tunnel establishing procedure in FIG. 9 to achieve a single feedback tunnel.

For example, at step 904, the CU-CP unit may transmit an indication requiring the UL TNL information of a single feedback tunnel for all of the at least one of the M-DRB and one or more U-DRBs. Then, at step 905, the CU-UP unit may allocate UL TNL information for the single feedback tunnel. At step 906, the CU-UP unit may associate the UL TNL information for the single feedback tunnel with the bearer context ID of the shared tunnel. At step 907, the CU-UP unit may transmit the UL TNL information for the single feedback tunnel to the CU-CP unit. After receiving the UL TNL information for the single feedback tunnel, at step 908, the CU-CP unit may transmit the UL TNL information for the single feedback tunnel to the DU such that the DU may associate the UL TNL information for each feedback tunnel with the bearer context ID of the shared tunnel at step 909.

Since the data delivery status frame for each of the at least one of the M-DRB and one or more U-DRBs is transmitted in a single feedback tunnel, in order to differentiate the data delivery status frame for a M-DRB or a U-DRB, according to some embodiments of the present application, the data delivery status frame for the M-DRB may include a M-DRB identity (ID) and cell information of one or more cells associated with the M-DRB. For example, the M-DRB may be used in a multicast area including at least one cell. The data delivery status frame for the M-DRB may include a M-DRB ID and cell information of the at least one cell included in the multicast area. In an embodiment of the present application, cell information of one or more cells may include a cell ID of each cell of the one or more cells.

For example, the following table 1 shows an example of a data delivery status frame for M-DRB. This frame format is defined to transfer feedback to allow the receiving node (i.e. the node that hosts the PDCP entity) to control the downlink user data flow via the sending node (i.e. the corresponding node, e.g., a DU) for a M-DRB associated with a shared GTP-U tunnel.

Referring to table 1, in addition to the cell information and the M-DRB ID, the data delivery status frame for the M-DRB may also include the following parameters:

Lost Packet Report: this parameter indicates the presence of number of lost NR user plane (NR-U) sequence number ranges reported, start of lost NR-U sequence number range and end of lost NR-U sequence number range Cause Report: this parameter indicates the presence of cause value. The cause value indicates specific events reported by the corresponding node.

Final Frame Indication (i.e., Final Frame Ind): this parameter indicates whether the frame is the last DL status report.

Delivered Retransmitted NR PDCP SN Ind: this parameter indicates the presence of successfully delivered retransmitted PDCP sequence number.

Highest Delivered NR PDCP SN Ind: this parameter indicates the presence of highest successfully delivered PDCP sequence number.

Delivered Retransmitted NR PDCP SN Ind: this parameter indicates the presence of successfully delivered retransmitted PDCP sequence number.

Highest Transmitted NR PDCP SN Ind: this parameter indicates the presence of the highest transmitted NR PDCP Sequence Number.

Data Rate Indication: this parameter indicates the presence of the desired data rate.

PDU Type: this parameter may be set to 1 for the data delivery status frame for the M-DRB.

Desired buffer size for the data radio bearer: this parameter indicates the desired buffer size in bytes for the concerned data radio bearer.

Desired Data Rate: this parameter indicates the amount of data desired to be received in bytes in a specific amount of time for a specific data radio bearer established for the UE.

status of NR PDCP PDU sequence at the corresponding node to the lower layers.

Cause value: the parameter indicates specific events reported by the corresponding node.

Successfully delivered retransmitted NR PDCP Sequence Number: this parameter indicates the NR PDCP PDU sequence number associated with the highest NR-U sequence number among the retransmission NR PDCP PDUs successfully delivered to the UE in sequence of NR-U sequence number.

Retransmitted NR PDCP Sequence Number: this parameter indicates the NR PDCP PDU sequence number associated with the highest NR-U sequence number among the retransmission NR PDCP PDUs transmitted to the lower layers in sequence of NR-U sequence number.

Padding: the padding is included at the end of the frame to ensure that the NR user plane protocol PDU length.

TABLE 1

| a data delivery status frame for M-DRB | | | | | |
|---|---|---|---|---|---|
| Bits | | | | | Number of |
| 7  6  5  4 | 3 | 2 | 1 | 0 | Octets |
| PDU Type (=1) | Highest Transmitted NR PDCP SN Ind | Highest Delivered NR PDCP SN Ind | Final Frame Ind. | Lost Packet Report | 1 |
| Spare | Data rate Ind. | Retransmitted NR PDCP SN Ind | Delivered Retransmitted NR PDCP SN Ind | Cause Report | 1 |
| Cell information | | | | | 3 |
| MRB ID | | | | | 2 |
| Desired buffer size for the data radio bearer | | | | | 4 |
| Desired Data Rate | | | | | 0 or 4 |
| Number of lost NR-U Sequence Number ranges reported | | | | | 0 or 1 |
| Start of lost NR-U Sequence Number range | | | | | 0 or (6* |
| End of lost NR-U Sequence Number range | | | | | Number of reported lost NR-U SN ranges) |
| Highest successfully delivered NR PDCP Sequence Number | | | | | 0 or 3 |
| Highest transmitted NR PDCP Sequence Number | | | | | 0 or 3 |
| Cause Value | | | | | 0 or 1 |
| Successfully delivered retransmitted NR PDCP Sequence Number | | | | | 0 or 3 |
| Retransmitted NR PDCP Sequence Number | | | | | 0 or 3 |
| Padding | | | | | 0-3 |

Number of lost NR-U Sequence Number ranges reported: this parameter indicates the number of NR-U sequence number ranges reported to be lost.

Start of lost NR-U Sequence Number range: this parameter indicates the start of an NR-U sequence number range reported to be lost.

End of lost NR-U Sequence Number range: this parameter indicates the end of an NR-U sequence number range reported to be lost.

Highest successfully delivered NR PDCP Sequence Number: this parameter indicates feedback about the in-sequence delivery status of NR PDCP PDUs at the corresponding node towards the UE.

Highest transmitted NR PDCP Sequence Number: this parameter indicates the feedback about the transmitted According to some embodiments of the present application, the data delivery status frame for the U-DRB may include a U-DRB ID and a UE ID. In an embodiment of the present application, the UE ID may be cell-radio network temporary identifier (C-RNTI), and F1 application protocol (F1-AP) UE association ID etc.

For example, the following table 2 shows an example of a data delivery status frame for U-DRB. This frame format is defined to transfer feedback to allow the receiving node (i.e. the node that hosts the PDCP entity) to control the downlink user data flow via the sending node (i.e. the corresponding node, e.g., a DU) for a U-DRB associated with a shared GTP-U tunnel.

Referring to table 2, in addition to the U-DRB ID and a UE ID, the parameters included in table 2 may be the same as those included in table 1.

TABLE 2

| a data delivery status frame for U-DRB | | | | | | | | |
|---|---|---|---|---|---|---|---|---|
| Bits | | | | | | | | Number of |
| 7 | 6 | 5 | 4 | 3 | 2 | 1 | 0 | Octets |
| PDU Type (=1) | | | | Highest Transmitted NR PDCP SN Ind | Highest Delivered NR PDCP SN Ind | Final Frame Ind. | Lost Packet Report | 1 |
| Spare | | | | Data rate Ind. | Retransmitted NR PDCP SN Ind | Delivered Retransmitted NR PDCP SN Ind | Cause Report | 1 |
| UE ID | | | | | | | | 3 |
| DRB ID | | | | | | | | 2 |
| Desired buffer size for the data radio bearer | | | | | | | | 4 |
| Desired Data Rate | | | | | | | | 0 or 4 |
| Number of lost NR-U Sequence Number ranges reported | | | | | | | | 0 or 1 |
| Start of lost NR-U Sequence Number range | | | | | | | | 0 or (6* |
| End of lost NR-U Sequence Number range | | | | | | | | Number of reported lost NR-U SN ranges) |
| Highest successfully delivered NR PDCP Sequence Number | | | | | | | | 0 or 3 |
| Highest transmitted NR PDCP Sequence Number | | | | | | | | 0 or 3 |
| Cause Value | | | | | | | | 0 or 1 |
| Successfully delivered retransmitted NR PDCP Sequence Number | | | | | | | | 0 or 3 |
| Retransmitted NR PDCP Sequence Number | | | | | | | | 0 or 3 |
| Padding | | | | | | | | 0-3 |

Figure 11:
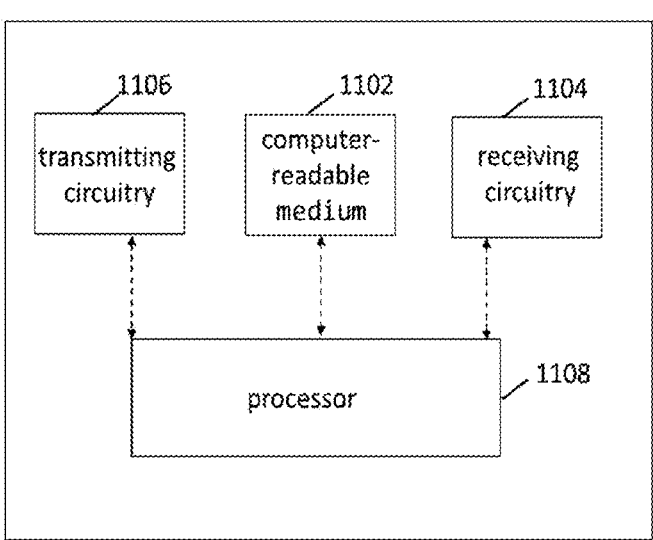
FIG. 11 illustrates a simplified block diagram of an apparatus for MBS according to some embodiments of the present application.

FIG. 11 illustrates a simplified block diagram of an apparatus 1100 for MBS according to some embodiments of the present application. The apparatus 1100 may be a CU or a DU as shown in FIG. 2, or may be a CU-CP unit, a CU-UP unit, or a DU as shown in FIG. 3.

Referring to FIG. 11, the apparatus 1100 may include at least one non-transitory computer-readable medium 1102, at least one receiving circuitry 1104, at least one transmitting circuitry 1106, and at least one processor 1108. In some embodiment of the present application, at least one receiving circuitry 1104 and at least one transmitting circuitry 1106 and be integrated into at least one transceiver. The at least one non-transitory computer-readable medium 1102 may have computer executable instructions stored therein. The at least one processor 1108 may be coupled to the at least one non-transitory computer-readable medium 1102, the at least one receiving circuitry 1104 and the at least one transmitting circuitry 1106. The computer executable instructions can be programmed to implement a method with the at least one receiving circuitry 1104, the at least one transmitting circuitry 1106 and the at least one processor 1108. The method can be a method according to an embodiment of the present application, for example, the method shown in FIGS. 5-10.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus including a processor and a memory. Computer programmable instructions for implementing a method stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A network entity for wireless communication, comprising:

at least one memory; and at least one processor coupled with the at least one memory and operable to cause the network entity to:

transmit a set of user data packet over a shared tunnel for multicast data radio bearer (M-DRB) and unicast data radio bearer (U-DRB), wherein each of the set of user data packet is associated with at least one of:

a M-DRB; and one or more U-DRBs; and receive a data delivery status frame for each of the at least one of the M-DRB and the one or more U-DRBs in:

separate feedback tunnels; or a single feedback channel, wherein the data delivery status frame includes at least an identity (ID) associated with the at least one of the M-DRB and the one or more U-DRBs.

2. The network entity of claim 1, wherein the at least one processor is operable to cause the network entity to:

receive the data delivery status frame for each of the at least one of the M-DRB and the one or more U-DRBs in the separate feedback tunnels;

establish a corresponding feedback tunnel for each of the at least one of the M-DRB and the one or more U-DRBs, including to allocate uplink (UL) transport network layer (TNL) information of the corresponding feedback tunnel;

associate the UL TNL information of the feedback tunnel with bearer context ID of the shared tunnel; and transmit the UL TNL information of the corresponding feedback tunnel and the bearer context ID of the shared tunnel.

3. The network entity of claim 1, wherein the at least one processor is operable to cause the network entity to establish a corresponding feedback tunnel for each of the at least one of the M-DRB and the one or more U-DRBs, including to:

receive an indication requiring uplink (UL) transport network layer (TNL) information of the corresponding feedback tunnel from a central unit control plane (CU-CP) unit;

allocate the UL TNL information of the corresponding feedback tunnel;

associate the UL TNL information of the corresponding feedback tunnel with bearer context ID of the shared tunnel; and transmit the UL TNL information of the corresponding feedback tunnel.

4. The network entity of claim 3, wherein the UL TNL information indicates an internet protocol (IP) address and a general packet radio service (GPRS) tunneling protocol (GTP) user plane (GTP-U) tunnel endpoint identifier (TEID).

5. The network entity of claim 1, wherein the at least one processor is operable to cause the network entity to:

receive the data delivery status frame for each of the at least one of the M-DRB and the one or more U-DRBs in the single feedback tunnel, wherein the data delivery status frame includes one or more of an M-DRB ID and cell information of one or more cells associated with the M-DRB, or a U-DRB ID and a user equipment (UE) ID associated with the U-DRB; and establish the single feedback tunnel.

6. A network entity for wireless communication, comprising:

at least one memory; and at least one processor coupled with the at least one memory and operable to cause the network entity to:

receive a set of user data packet over a shared tunnel for multicast data radio bearer (M-DRB) and unicast data radio bearer (U-DRB), wherein each of the set of user data packet is associated with at least one of:

a M-DRB; and one or more U-DRBs; and transmit a data delivery status frame for each of the at least one of the M-DRB and one or more U-DRBs in:

separate feedback tunnels; or a single feedback channel, wherein the data delivery status frame includes at least an identity (ID) associated with the at least one of the M-DRB and the one or more U-DRBs.

7. The network entity of claim 6, comprising transmitting wherein the at least one processor is operable to cause the network entity to:

transmit the data delivery status frame for each of the at least one of the M-DRB and the one or more U-DRBs in the separate feedback tunnels;

establish a corresponding feedback tunnel for each of the at least one of the M-DRB and one or more U-DRBs, including to receive uplink (UL) transport network layer (TNL) information of the corresponding feedback tunnel; and associate the UL TNL information of the corresponding feedback tunnel with bearer context ID of the shared tunnel.

8. The network entity of claim 7, wherein the UL TNL information indicates an internet protocol (IP) address and a general packet radio service (GPRS) tunneling protocol (GTP) user plane (GTP-U) tunnel endpoint identifier (TEID).

9. The network entity of claim 7, wherein the UL TNL information of the corresponding feedback tunnel is received from a central unit control plane (CU-CP) unit.

10. The network entity of claim 6, wherein the at least one processor is operable to cause the network entity to:

establish the single feedback tunnel.

11. The network entity of claim 6, wherein the data delivery status frame for the M-DRB includes an M-DRB ID and cell information of one or more cells associated with the M-DRB.

12. The network entity of claim 6, wherein the data delivery status frame for each U-DRB includes a U-DRB ID and a user equipment (UE) ID associated with the U-DRB.

13. A network entity for wireless communication, comprising:

at least one memory; and at least one processor coupled with the at least one memory and operable to cause the network entity to:

transmit an indication requiring uplink (UL) transport network layer (TNL) information of at least one feedback tunnel for data delivery status frame, wherein the at least one feedback tunnel is associated with at least one of a multicast data radio bearer (M-DRB) and one or more unicast data radio bearers (U-DRBs), and the at least one feedback tunnel comprises:

separate feedback tunnels for each of the at least one of the M-DRB and the one or more U-DRBs; or a single feedback channel, wherein the data delivery status frame includes at least an identity (ID) associated with the at least one of the M-DRB and the one or more U-DRBs.

14. The network entity of claim 13, wherein each feedback tunnel of the at least one feedback tunnel is associated with a corresponding data radio bearer (DRB) of the at least one of the M-DRB and the one or more U-DRBs.

15. The network entity of claim 13, wherein the indication requires the UL TNL information of one feedback tunnel associated with the M-DRB.

16. The network entity of claim 13, wherein the indication requires the UL TNL information of one feedback tunnel associated with one U-DRB.

17. The network entity of claim 13, wherein the indication requires the UL TNL information of a plurality of feedback tunnels for a plurality of U-DRBs, each feedback tunnel of the plurality of feedback tunnels is associated with a corresponding U-DRB of the plurality of U-DRBs.

18. The network entity of claim 13, wherein the indication requires the UL TNL information of the single feedback channel for all of the at least one of the M-DRB and the one or more U-DRBs.

19. The network entity of claim 13, wherein the at least one processor is operable to cause the network entity to, for each feedback tunnel:

receive the UL TNL information of the at least one feedback tunnel; and transmit the UL TNL information of the at least one feedback tunnel.

20. The network entity of claim 13, wherein the UL TNL information indicates an internet protocol (IP) address and a general packet radio service (GPRS) tunneling protocol (GTP) user plane (GTP-U) tunnel endpoint identifier (TEID).

* * * * *